United States Patent
Akkapeddi et al.

(10) Patent No.: US 12,314,375 B2
(45) Date of Patent: May 27, 2025

(54) SYSTEM AND METHODS FOR AUTOMATIC ADJUSTMENT OF DATA SYNDICATIONS VIA IDENTIFICATION OF TECHNICALLY UNAUTHORIZED DATA-DISTRIBUTION

(71) Applicant: BANK OF AMERICA CORPORATION, Charlotte, NC (US)

(72) Inventors: Naga Vamsi Krishna Akkapeddi, Charlotte, NC (US); Lavanya Sambaraju, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 219 days.

(21) Appl. No.: 18/071,210

(22) Filed: Nov. 29, 2022

(65) Prior Publication Data

US 2024/0176867 A1 May 30, 2024

(51) Int. Cl.
G06F 21/45 (2013.01)

(52) U.S. Cl.
CPC .................................. G06F 21/45 (2013.01)

(58) Field of Classification Search
CPC ....... H04L 63/08; H04L 63/10; H04L 63/102; H04L 63/20; G06F 21/45
See application file for complete search history.

(56) References Cited

U.S. PATENT DOCUMENTS

| | | | |
|---|---|---|---|
| 575,790 A | 1/1897 | Rice | |
| 7,260,721 B2 | 8/2007 | Tanaka et al. | |
| 7,650,643 B2 | 1/2010 | Ishikawa et al. | |
| 7,788,271 B2 | 8/2010 | Soma et al. | |
| 7,978,859 B2 | 7/2011 | Conrado et al. | |
| 7,984,509 B2 | 7/2011 | Ginter et al. | |
| 8,498,941 B2 | 7/2013 | Felsher | |
| 8,543,806 B2 | 9/2013 | Peckover | |
| 8,612,707 B2 | 12/2013 | Prahlad et al. | |
| 8,677,507 B2 | 3/2014 | Ginter et al. | |
| 8,924,358 B1 | 12/2014 | Stringham | |
| 9,020,990 B2 | 4/2015 | Brockway et al. | |

(Continued)

OTHER PUBLICATIONS

Du et al. English translation of CN 109150805 B. (Year: 2021).*

*Primary Examiner* — John M MacIlwinen
(74) *Attorney, Agent, or Firm* — Moore & Van Allen PLLC; Nicholas C. Russell

(57) ABSTRACT

Systems, computer program products, and methods are described herein for adjustment of data syndications. The present disclosure is configured to receive a request for data feed subscription from a first downstream system; generate a response requesting one or more authorization credentials or data element usage rationale; transmit the response to the first downstream system; receive authorization credentials and data element usage rationale from the first downstream system; generate an authorization key and data feed subscription validity period for the first downstream system to access a set of data elements via a secure application programming interface (API); continually monitor incoming data requests from the first downstream system and one or more additional downstream systems for the authorization key and determine usage frequency of the authorization key; and automatically adjust the authorization key or data feed subscription validity period based on determined usage frequency of the authorization key.

15 Claims, 5 Drawing Sheets

(56) References Cited

U.S. PATENT DOCUMENTS

| | | | |
|---|---|---|---|
| 9,531,749 B2* | 12/2016 | Kementsietsidis | ............................ H04L 67/1001 |
| 9,548,986 B2 | 1/2017 | Jung et al. | |
| 9,852,149 B1 | 12/2017 | Taylor et al. | |
| 9,906,536 B1* | 2/2018 | Abraham | .............. H04L 63/102 |
| 10,762,036 B2 | 9/2020 | Gokhale et al. | |
| 10,824,589 B2 | 11/2020 | Jain et al. | |
| 10,831,608 B2 | 11/2020 | Prahlad et al. | |
| 11,016,858 B2 | 5/2021 | Kottomtharayil et al. | |
| 11,308,035 B2 | 4/2022 | Prahlad et al. | |
| 11,991,216 B1* | 5/2024 | Venkatachari | .......... H04L 63/20 |
| 2005/0273499 A1* | 12/2005 | Goodman | ................ H04L 67/02 709/206 |
| 2008/0052541 A1 | 2/2008 | Ginter et al. | |
| 2010/0313013 A1 | 12/2010 | Ginter et al. | |
| 2012/0331529 A1* | 12/2012 | Ibel | ............................ H04L 9/32 726/4 |
| 2013/0198827 A1* | 8/2013 | Bhaskaran | .............. H04L 63/10 726/7 |
| 2016/0026983 A1* | 1/2016 | Lindsley | ............ G06Q 30/0635 705/26.81 |
| 2016/0182516 A1* | 6/2016 | Gibbons | ................ H04L 63/10 726/1 |
| 2018/0278624 A1* | 9/2018 | Kuperman | ............ H04L 9/3271 |
| 2021/0286663 A1* | 9/2021 | Thomas | ................ G06F 11/076 |

\* cited by examiner

SYSTEM AND METHODS FOR AUTOMATIC ADJUSTMENT OF DATA SYNDICATIONS VIA IDENTIFICATION OF TECHNICALLY UNAUTHORIZED DATA-DISTRIBUTION

TECHNOLOGICAL FIELD

Example embodiments of the present disclosure relate to automatic adjustment of data syndications via identification of technically unauthorized data-distribution.

BACKGROUND

In conventional systems, it may be difficult to track and manage the dissemination of sensitive data distributed across an entity to multiple users, groups, teams, or the like. There is a need for an improved system that provides a manner of authenticating specific use-cases prior to sharing sensitive data, and which provides the ability to alter permissions or track data after it has been disseminated to ensure that the data is not further shared with unauthorized parties.

Applicant has identified a number of deficiencies and problems associated with automatic adjustment of data syndications. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for automatic adjustment of data syndications via identification of technically unauthorized data-distribution. The present invention addresses the above needs by providing a solution designed to promote authorized data distribution within an entity by using a time-period restraint on authorized subscription to certain data services via an authorization token shared with downstream systems in response to a successfully authorized request for data sharing from an authorized data source. The subscriber specific policy is created with a token and validity period such that the subscription is required to be renewed by downstream systems at regular intervals. Each time that a subscriber needs to use data on their system, token are exchanged at run time between the authorized data system and a given program for a given purpose via a secure application programming interface (API). The API allows the subscriber to provide relevant information at the time of data request including providing intended usage of the data elements requested. The usage of these data elements on the downstream subscriber systems are also tracked and traced using code scan APIs by the authorized data source. The output of the two APIs (i.e., subscriber request API and code scan API) are then compared for any discrepancy. If there is any data element not being used by the downstream system, it will be auto-revived and auto-adjusted to the respective subscription level. Furthermore, any usage of data elements being exposed to external systems through API or database procedures can be detected and thwarted by removing access rights to the downstream system at issue.

Typically the system comprises: at least one memory device with computer-readable program code stored thereon; at least one communication device; at least one processing device operatively coupled to the at least one memory device and the at least one communication device, wherein executing the computer-readable code is configured to cause the at least one processing device to: receive a request for data feed subscription from a first downstream system; generate a response requesting one or more authorization credentials or data element usage rationale; transmit the response to the first downstream system; receive authorization credentials and data element usage rationale from the first downstream system; generate an authorization key and data feed subscription validity period for the first downstream system to access a set of data elements via a secure application programming interface (API); continually monitor incoming data requests from the first downstream system and one or more additional downstream systems for the authorization key and determine usage frequency of the authorization key; and automatically adjust the authorization key or data feed subscription validity period based on determined usage frequency of the authorization key.

In some embodiments, the authorization credentials are automatically determined by comparing a device or network identifier of the first downstream system to a database of pre-authorized downstream systems.

In some embodiments, the authorization credentials further comprise a username and password combination of a specific user of the first downstream system.

In other embodiments, the authorization key further comprises a hash value or token based on the first downstream system and the usage rationale.

In further embodiments, the validity period is a timespan of days, weeks, or months for which the authorization key remains valid.

In still further embodiments, the invention is further configured determine that the authorization key generated for the first downstream system is provided in an incoming data request from the one or more additional downstream systems.

In other embodiments, the invention is further configured to monitor data elements on the first downstream system and the one or more additional downstream systems via secure API call; and determine one or more data elements shared with the first downstream system reside(s) on the one or more additional downstream systems.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
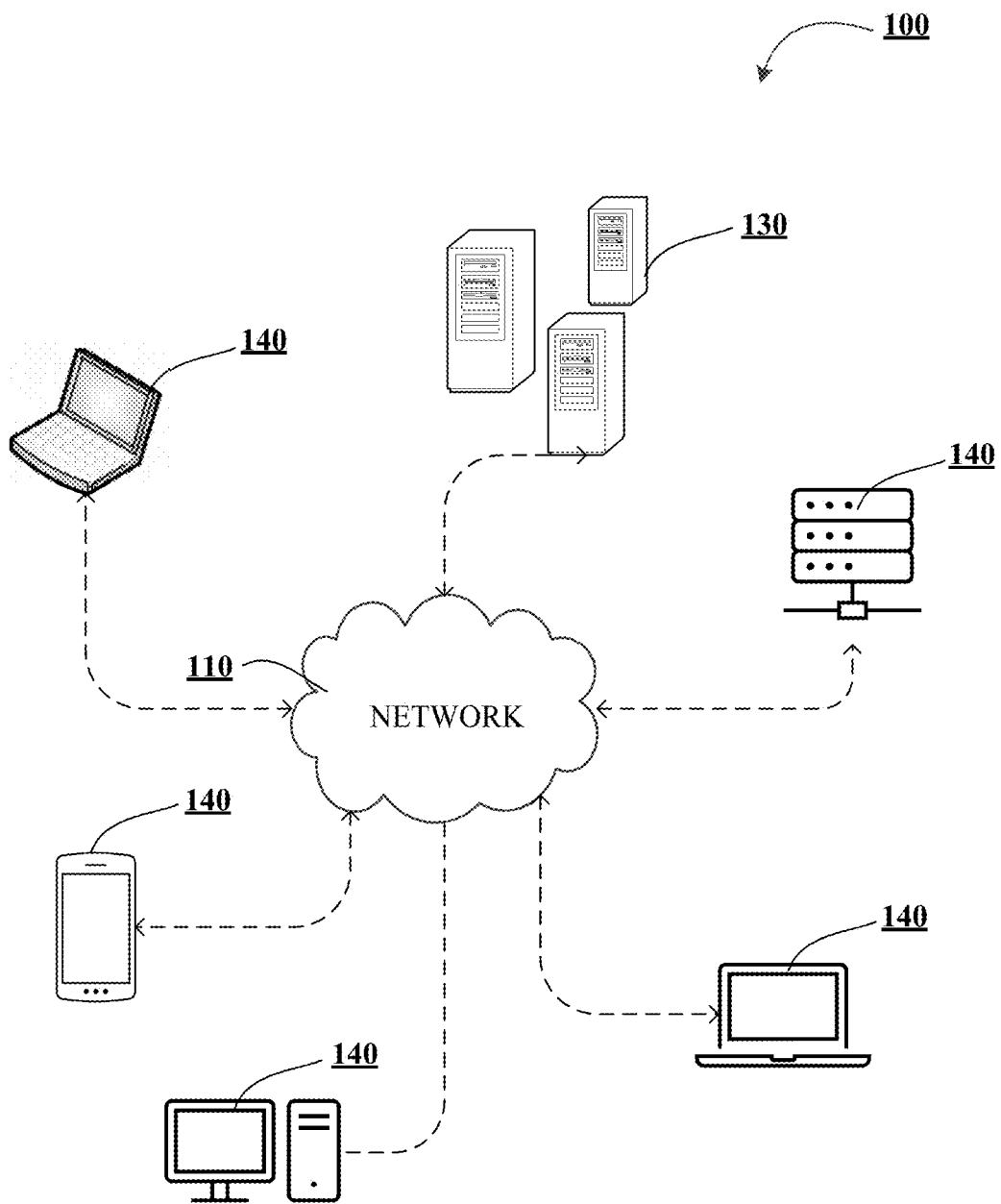
Figure 1B:
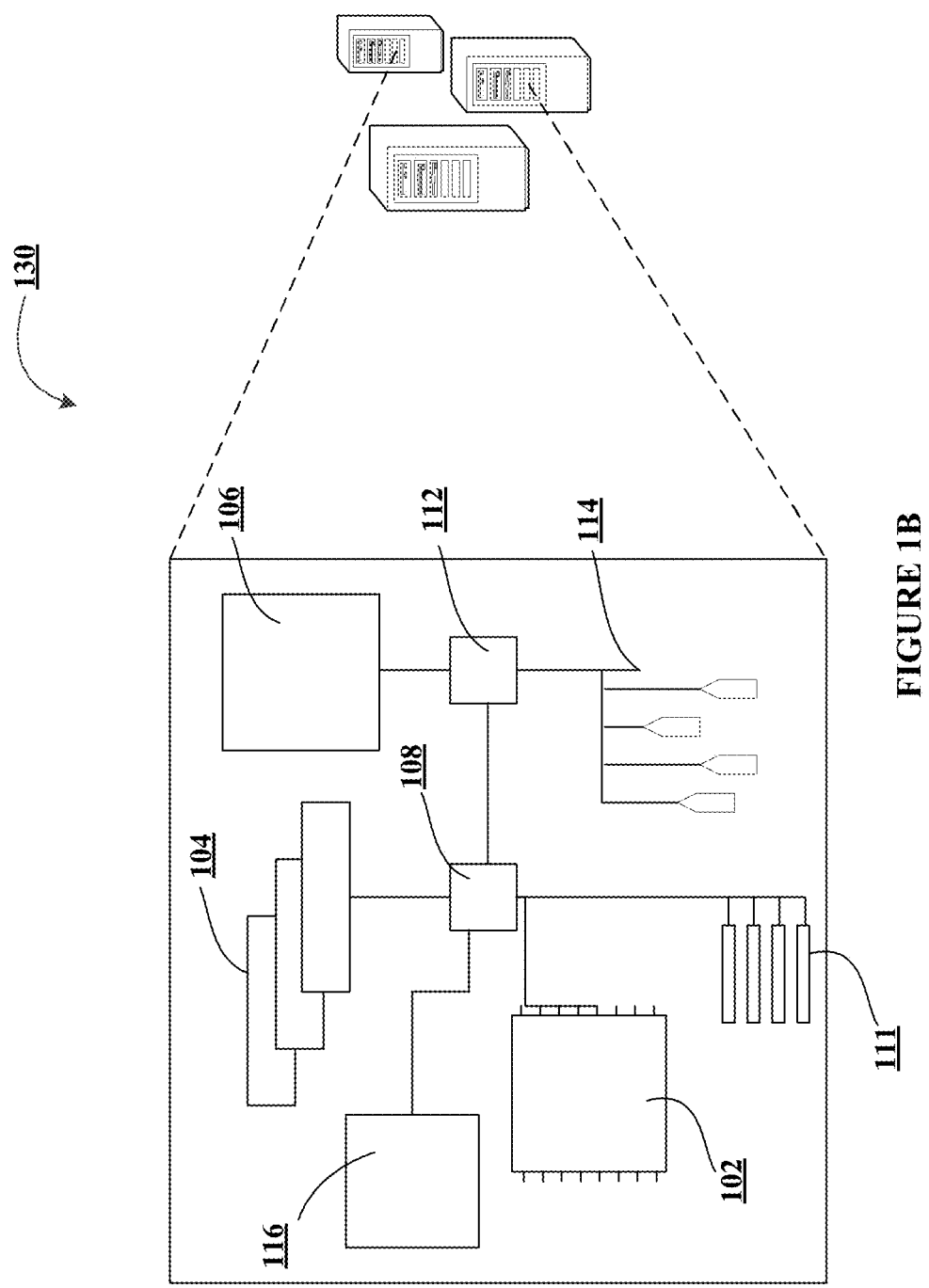
Figure 1C:
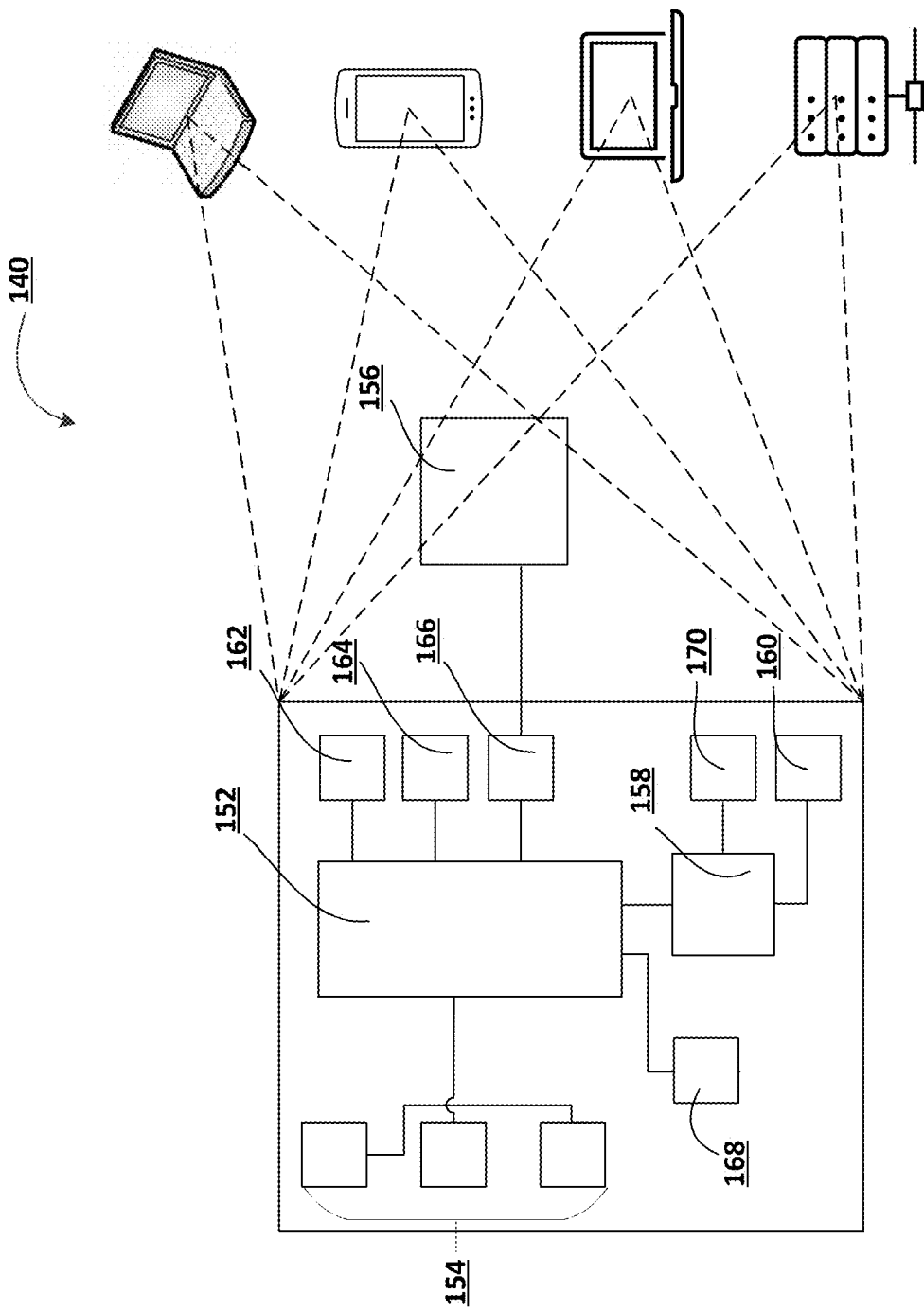
Figure 2:
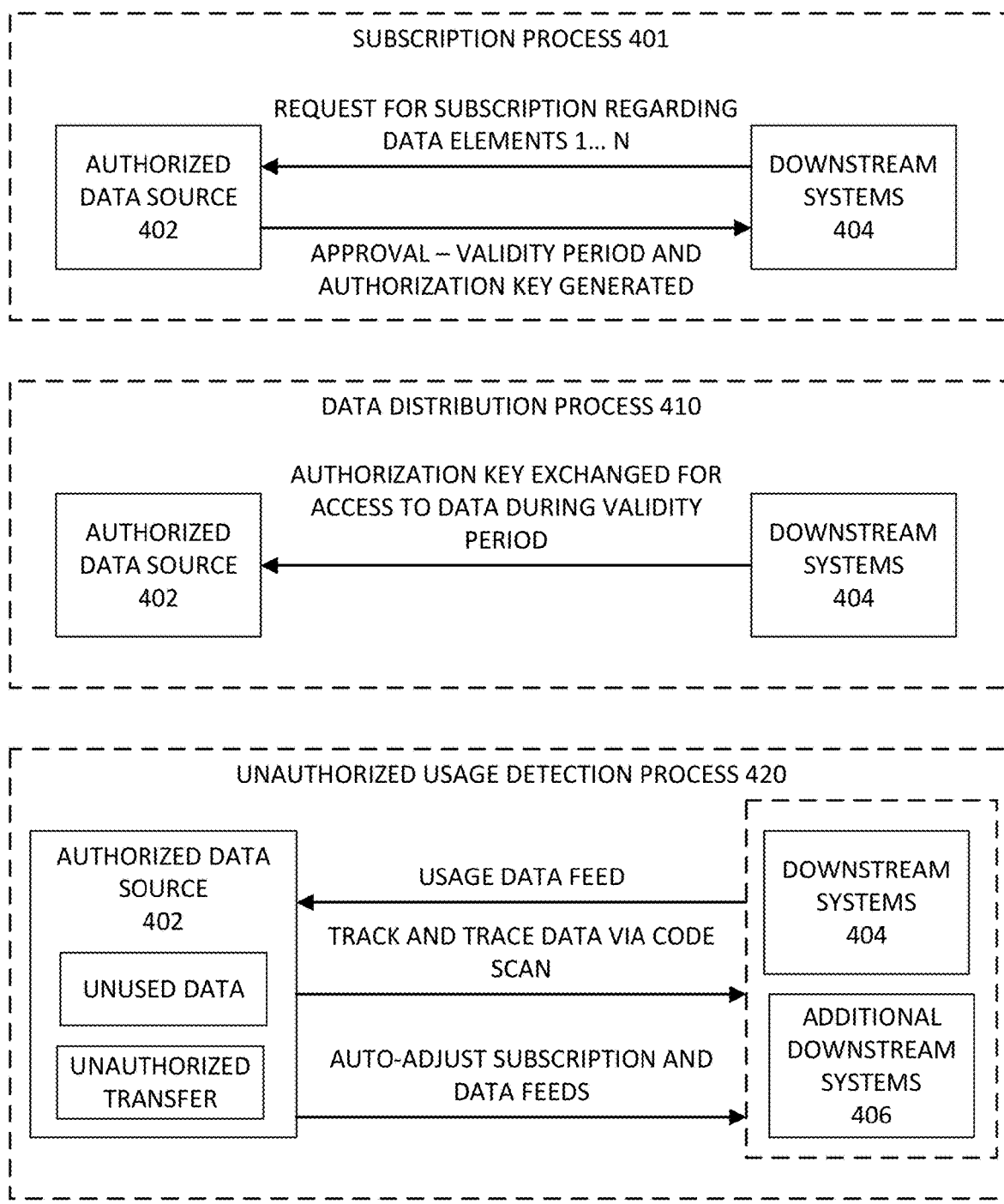
Figure 3:
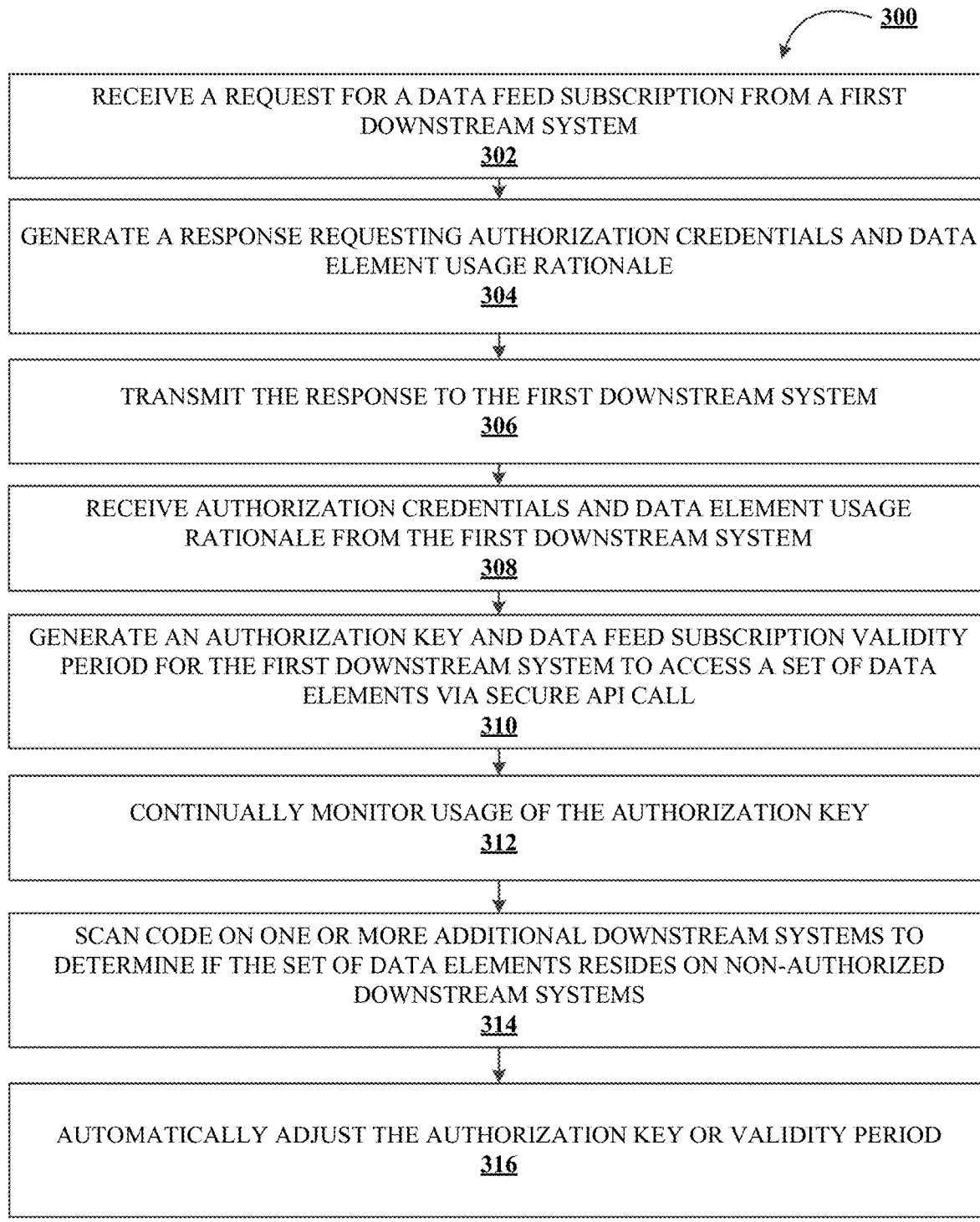

FIGS. 1A-1C illustrates technical components of an exemplary distributed computing environment for automatic adjustment of data syndications via identification of technically unauthorized data-distribution, in accordance with an embodiment of the disclosure;

FIG. 2 illustrates a process flow for automatic adjustment of data syndications via identification of technically unauthorized data-distribution, in accordance with an embodiment of the disclosure; and FIG. 3 illustrates a high-level process flow for automatic adjustment of data syndications via identification of technically unauthorized data-distribution, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

FIGS. 1A-1C illustrate technical components of an exemplary distributed computing environment for automatic adjustment of data syndications via identification of technically unauthorized data-distribution 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for automatic adjustment of data syndications via identification of technically unauthorized data-distribution, in accordance with an embodiment of the disclosure. As shown in block 401, the process begins wherein the authorized data source 402 operatively connects with downstream systems 404 in order to conduct a subscription process 401. The subscription process 401 begins whereby the downstream systems 404 request subscription for a data feed for certain data elements (i.e., any number of specific data elements numbered 1 to N, or the like). The authorized data source 402 may approve the subscription to a data feed for certain elements requested by downstream systems 404. It is understood that approval may be based on a number of factors. In some embodiments, approval is based on authorization credentials of one or more users provided from the downstream systems 404. In other embodiments, the authorized data source 402 may be pre-configured to automatically approve certain requests for subscription from specific downstream systems 404 for certain data elements, so the approval may be based on network information or device information of the downstream systems 404 such as internal internet protocol (IP) address, physical device address, or the like. In other embodiments, approval may be based on one or more token(s) or authorization key(s) previously issued by the authorized data source 402 for previous subscriptions, indicating that the downstream systems 404 were already previously approved to receive a data feed for certain data elements. In some embodiments, approval may comprise a validity period (e.g., a period of days, weeks, months, or the like), and an authorization key. It is understood that the authorization key may take any number of forms but is generally a pre-shared key in the form of a hash value unique to the downstream systems 404, as well as unique to data feeds requested and approved by the authorized data source. In this way, the hash value may coincide with a specific downstream system, group of systems, use-case, data feed, validity period, user group, or the like. It is understood that the authorization key may be provided back to the authorized data source by the downstream systems at a later time, when data feeds are accessed by the downstream systems 494.

Moving further in FIG. 2, block 410 represents a data distribution process 410 after the authorization key and validity period have been generated for one or more downstream systems 404. As discussed regarding block 401, the authorization key must be provided back to the authorized data source 402 in order for the downstream systems 404 to receive data elements from the authorized data source 402. It is understood that the authorizes data source 402 may reference the provided authorization key in order to determine if the requesting downstream system 404 meets the authorization requirements and is within a validity period to request the data elements. For instance, a downstream system 404 may provide an outdated authorization key in some instances, and the authorized data source 402 may reject the request for certain data elements that are not authorized to be provided given that the validity period has ended. For example, an authorization key may be generated during the subscription process 401 with a validity period of 365 days. If the downstream system 404 generates an API call with the authorization key on the 366$^{th}$ day, the authorized data source 402 may prompt the downstream system 404 to undergo a re-authorization process and provide updated rationale for why the data is needed, how it will be used, what systems require the data, how the data will be shared further downstream, or the like. In this way, the authorized data source 402 is designed to continually update databases containing information regarding how data is shared throughout the entity downstream.

Shown in block 420 is a process flow for unauthorized usage detection 420. As shown in block 420, the authorized data source 402 may proactively take steps to determine unused data and unauthorized transfer of data. For instance, a downstream system 404 may be authorized to request certain data from the authorized data source 402 for a given validity period, but the downstream systems 404 may not have requested such data for a period of days, weeks, months, or the like, despite being authorized to do so. In some embodiments, the authorized data source 402 may be programmed to detect unused data authorizations after a given threshold period, such as a number of days, weeks, months, or the like. The authorized data source 402 may flag a determination that a data feed is unused by attaching a metadata label to the authorization key associated with such data in a reference database of the authorized data source 402. Furthermore, the authorized data source 402 may take proactive steps to determine unauthorized transfer of data. For instance, the authorized data source 402 may require downstream systems 404 to provide a data feed back to the authorized data source 402 containing information regarding the usage of data elements each time they are used (e.g., <elements, request API, program name, purpose>, or the like) via a secure API connection between the authorized data source 402 and the downstream systems 404. In other embodiments, the authorized data source 402 may take further steps to track or trace the usage of provided data elements via a code scan API which will search metadata on downstream systems 404 in order to locate elements not owned by or authorized for use by certain downstream systems 404. In this way, the authorized data source 402 may locate data elements which are linked to a number of authorization keys specific to certain downstream systems 404, such as downstream systems X or Y. If the data elements linked to authorization keys for downstream systems X and Y are located on downstream system Z, such as additional downstream systems 406, the authorized data source 402 may auto adjust subscription and data feeds in order to halt the flow of data elements to downstream systems X and Y, or may proactively generate a message to downstream system Z requesting it undergo the subscription process itself in order to obtain an authorization key which links downstream system Z to the given data elements. Additionally, any usage of the data elements which exposes the data elements to external systems through API or database procedures may be detected by the code scanning process, and the data feed subscriptions associated with hose data elements may be automatically reviewed and automatically adjusted in order to limit unauthorized sharing of data with external systems.

It is understood that, in addition to automatically adjusting the authorization key in response to determining certain data subscriptions are not utilized or being used to share data elements in an unauthorized fashion to multiple downstream systems or third parties, the system may also take additional automated actions in response to the results of the code scanning process. For instance, the system may also automatically adjust data syndication from the authorized data source to downstream systems based on the findings of the code scanning process. In some embodiments, the data syndication linked to the authorization key may be adjusted to limit the data elements shared with an authorized downstream system. In some embodiments, the system may also automate a transmission or request to the authorized downstream system inquiring the authorized downstream to send or provide information in response regarding data elements usage, as well as providing access to the downstream systems such that the authorized data source may run additional code scans on the data contained in one or more data stores of the downstream systems to obtain information on data element usage.

FIG. 3 illustrates a high-level process flow for automatic adjustment of data syndications via identification of technically unauthorized data-distribution, in accordance with an embodiment of the disclosure. As shown in block 302, the process begins whereby the system (such as the authorized data source (ADS) 402) receives a request for a data feed subscription from a first downstream system. The system responds by generating a response requesting authorization credentials and data element usage rationale from the first downstream system, as shown in block 304. The response is transmitted to the first downstream system, as shown in block 306. Next, the system may receive the requested authorization credentials and data element usage rationale (e.g., <data elements, program name, purpose>, or the like) from the first downstream system, as shown in block 308.

Next, as shown in block 310, the system generates an authorization key and data feed subscription validity period for the first downstream system to access a set of data elements via secure API call. It is understood that the authorization key may take a number of forms, but it generally a has value that combines identifying characteristics of the first downstream system with the data of the request, such as the relevant category of data elements requested, the purpose of the request, or the like. Following generation of the authorization key, the system may store the authorization key in an authorization key databased on the system for future reference and comparison with provided authorization keys from the first downstream system or other downstream systems. In this way, the system may keep a log of the downstream systems which are authorized to access certain data feeds, for what purpose they are authorized, or the like. In addition to attached metadata to the authorization key, the authorization key itself may be decrypted using an decryption key in order to show the underlying hashed values for which the authorization key represents. In this way, the system may keep a log of encrypted authorization keys, and may decrypt them as needed on a per-use basis in order to check that the downstream system providing the authorization key at a future time is the proper authorized party to be using the authorization key. For instance, in some embodiments, the first downstream system may generate an API call to request data element X, and may provide an authorization key generated when the first downstream system initially underwent the authorization process to subscribe to the data feed for data element X. The system may decrypt the authorization key, which represents a hashed value for the first downstream system device identifier, server address, username, password combination, data usage purpose, or the like, and may determine that the authorization key matches the first downstream system. In this way, the system may reduce the amount of data required to be stored to review data requests and determine authorization status.

As shown in block 312, the system continually monitors usage of the authorization key. For instance, each time the authorization key is received by the system, the system may log which downstream system provided the authorization key. In some embodiments, the authorization key may have been shared with a second downstream system, in which case the system would determine that the authorization key is invalid for use by the second downstream system. In some embodiments, in instances where the authorization key is used or provided back to the system by a second downstream system, the system may reject the use of the authorization key by the second downstream system and automatically adjust the authorization key to an inactive state until the first downstream system responds to an inquiry from the system regarding how or when the authorization key was shared with other systems, for what purpose, or the like. In some embodiments, the system may effectively deactivate the authorization key by adjusting the validity period to 0, as alluded to in block 316. In some embodiments, as shown in block 314, the system may scan code on one or more additional downstream systems to determine if the set of data elements (provided to the first downstream system in an authorized circumstance) resides on non-authorized downstream systems. In such instances, the system may also automatically adjust the authorization key or the validity period in order to prevent further access by the first downstream system until more information is obtained. It is understood that the code scan may be achieved using a secure API call to multiple downstream systems in order to request metadata for the data stored on the downstream systems. In this way, the bandwidth required to conduct a successful code-scan on the downstream systems is reduced. The system may recognize data as originating from the system by nature of the metadata associated with the data elements on the downstream systems, and it may identify one or more instances where data elements have been shared beyond the specific downstream system which was originally authorized to obtain the data elements via an active data feed subscription.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for automatic adjustment of data syndications, the system comprising:
   at least one non-transitory storage device; and
   at least one processor coupled to the at least one non-transitory storage device, wherein the at least one processor is configured to:
   receive a request for data feed subscription from a first downstream system;
   generate a response requesting one or more authorization credentials or data element usage rationale;
   transmit the response to the first downstream system;
   receive authorization credentials and data element usage rationale from the first downstream system;
   generate an authorization key and data feed subscription validity period for the first downstream system to access a set of data elements via a secure application programming interface (API), wherein the authorization key further comprises a hash value based on the first downstream system and the data element usage rationale;
   continually monitor incoming data requests from the first downstream system and one or more additional downstream systems for the authorization key and determine usage frequency of the authorization key, wherein monitoring further comprises logging a downstream system providing the authorization key;
   automatically adjust the authorization key or data feed subscription validity period based on determined usage frequency of the authorization key;
   monitor data elements on the first downstream system and the one or more additional downstream systems via secure API call; and
   determine one or more data elements shared with the first downstream system reside(s) on the one or more additional downstream systems.

2. The system of claim 1, wherein the authorization credentials are automatically determined by comparing a device or network identifier of the first downstream system to a database of pre-authorized downstream systems.

3. The system of claim 1, wherein the authorization credentials further comprise a username and password combination of a specific user of the first downstream system.

4. The system of claim 1, wherein the validity period is a timespan of days, weeks, or months for which the authorization key remains valid.

5. The system of claim 1, further configured to determine that the authorization key generated for the first downstream system is provided in an incoming data request from the one or more additional downstream systems.

6. A computer program product for adjustment of data syndications, the computer program product comprising a non-transitory computer-readable medium comprising code causing an apparatus to:
   receive a request for data feed subscription from a first downstream system;
   generate a response requesting one or more authorization credentials or data element usage rationale;
   transmit the response to the first downstream system;
   receive authorization credentials and data element usage rationale from the first downstream system;
   generate an authorization key and data feed subscription validity period for the first downstream system to access a set of data elements via a secure application programming interface (API), wherein the authorization key further comprises a hash value based on the first downstream system and the data element usage rationale;

continually monitor incoming data requests from the first downstream system and one or more additional downstream systems for the authorization key and determine usage frequency of the authorization key, wherein monitoring further comprises logging a downstream system providing the authorization key;

automatically adjust the authorization key or data feed subscription validity period based on determined usage frequency of the authorization key;

monitor data elements on the first downstream system and the one or more additional downstream systems via secure API call; and determine one or more data elements shared with the first downstream system reside(s) on the one or more additional downstream systems.

7. The computer program product of claim 6, wherein the authorization credentials are automatically determined by comparing a device or network identifier of the first downstream system to a database of pre-authorized downstream systems.

8. The computer program product of claim 6, wherein the authorization credentials further comprise a username and password combination of a specific user of the first downstream system.

9. The computer program product of claim 6, wherein the validity period is a timespan of days, weeks, or months for which the authorization key remains valid.

10. The computer program product of claim 6, further comprising a non-transitory computer-readable medium comprising code causing an apparatus to: determine that the authorization key generated for the first downstream system is provided in an incoming data request from the one or more additional downstream systems.

11. A method for adjustment of data syndications, the method comprising:

receiving a request for data feed subscription from a first downstream system;

generating a response requesting one or more authorization credentials or data element usage rationale;

transmitting the response to the first downstream system;

receiving authorization credentials and data element usage rationale from the first downstream system;

generating an authorization key and data feed subscription validity period for the first downstream system to access a set of data elements via a secure application programming interface (API), wherein the authorization key further comprises a hash value based on the first downstream system and the data element usage rationale;

continually monitoring incoming data requests from the first downstream system and one or more additional downstream systems for the authorization key and determine usage frequency of the authorization key, wherein monitoring further comprises logging a downstream system providing the authorization key;

automatically adjusting the authorization key or data feed subscription validity period based on determined usage frequency of the authorization key;

monitoring data elements on the first downstream system and the one or more additional downstream systems via secure API call; and determining one or more data elements shared with the first downstream system reside(s) on the one or more additional downstream systems.

12. The method of claim 11, wherein the authorization credentials are automatically determined by comparing a device or network identifier of the first downstream system to a database of pre-authorized downstream systems.

13. The method of claim 11, wherein the authorization credentials further comprise a username and password combination of a specific user of the first downstream system.

14. The method of claim 11, wherein the validity period is a timespan of days, weeks, or months for which the authorization key remains valid.

15. The method of claim 11, further comprising determining that the authorization key generated for the first downstream system is provided in an incoming data request from the one or more additional downstream systems.

* * * * *